Aug. 1, 1944.  J. W. HARTMAN  2,354,751
POULTRY FEEDER
Filed May 11, 1943   2 Sheets-Sheet 1
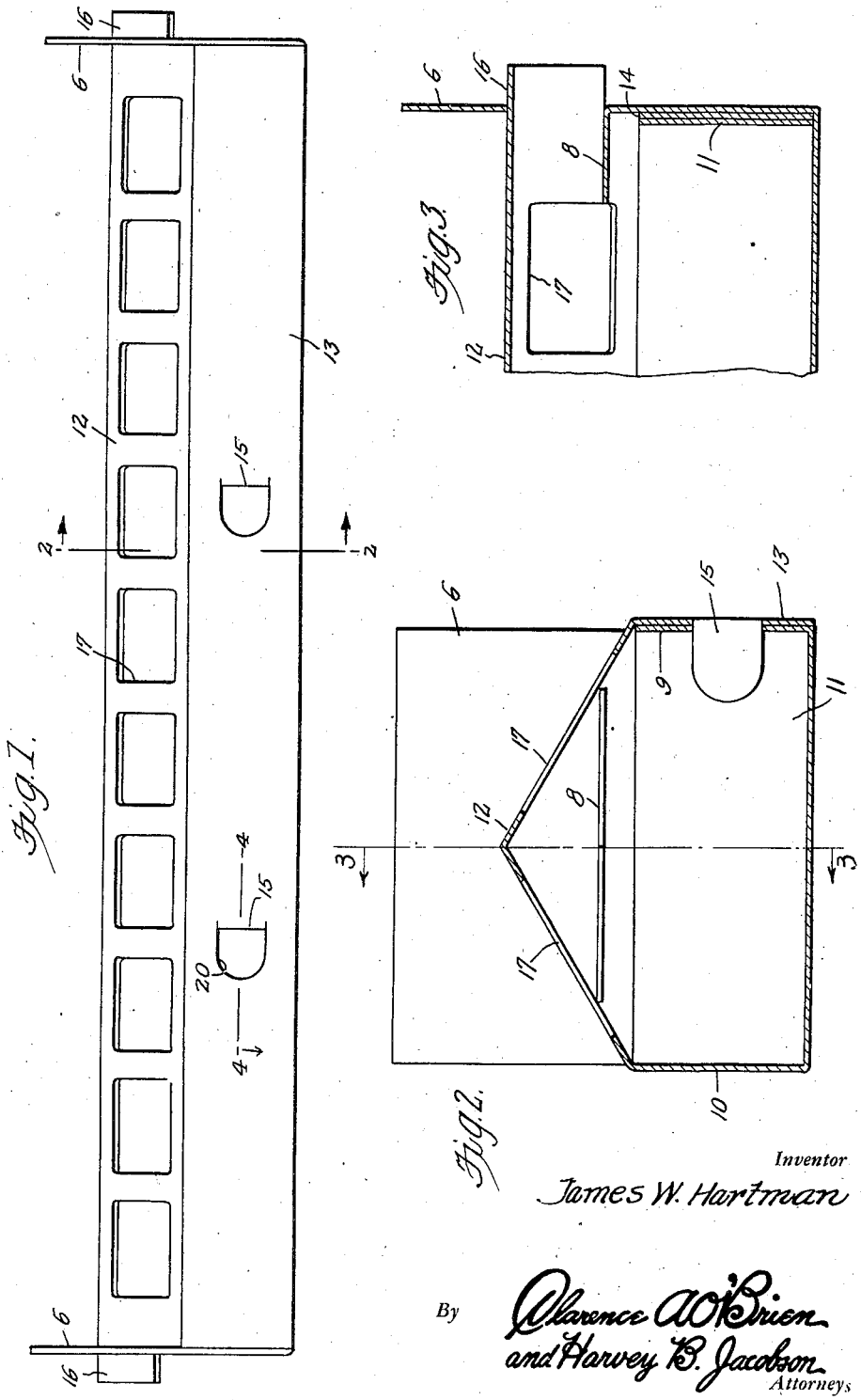
Inventor
James W. Hartman
By Clarence A. O'Brien
and Harvey B. Jacobson
Attorneys

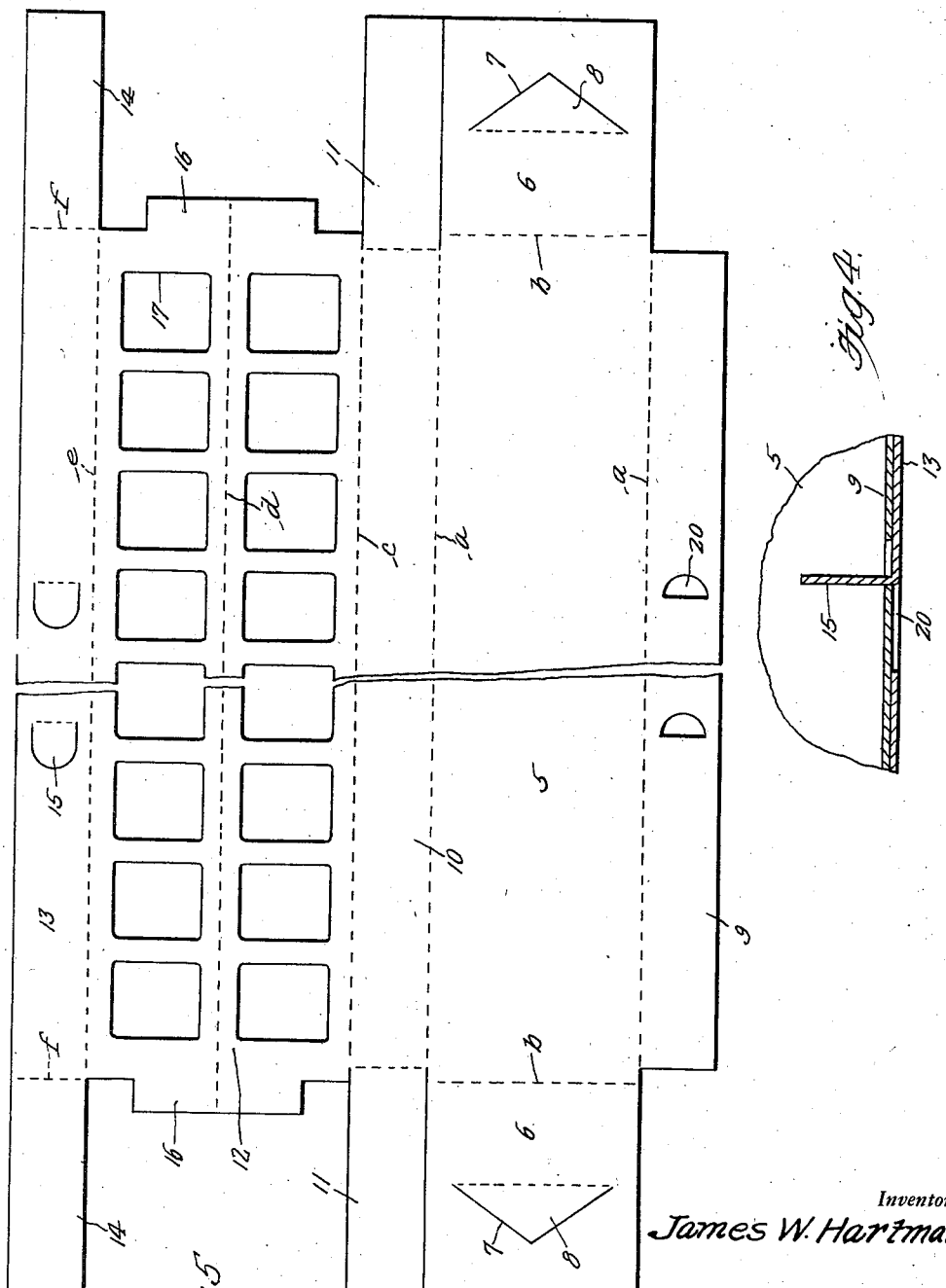

Patented Aug. 1, 1944

2,354,751

UNITED STATES PATENT OFFICE 2,354,751

POULTRY FEEDER

James W. Hartman, Crichton, Ala.

Application May 11, 1943, Serial No. 486,553

3 Claims. (Cl. 119—61)

This invention relates to new and useful improvements in poultry feeders, more particularly to a poultry feeder especially adapted for use in brooder houses.

The principal object of the present invention is to provide a poultry feeder especially adapted for feeding chicks, wherein the feeder is constructed of some readily accessible substitute for metal.

Another important object of the invention is to provide a chick feeder which can be readily formed from a blank sheet and discarded after it has had some use and has become somewhat mutilated, this at a very nominal expense.

Other objects and advantages of the invention will become apparent to the reader of the following description.

In the drawings:

Figure 1 is a side elevational view of the formed feeder.

Figure 2 is a cross-section on line 2—2 of Figure 1.

Figure 3 is a fragmentary vertical sectional view through one end of the feeder taken on a line 3—3 of Figure 2.

Figure 4 is a fragmentary detailed sectional view taken on line 4—4 of Figure 1.

Figure 5 is a fragmentary top plan view of the blank from which the feeder is constructed.

Referring to the drawings wherein like numerals designate like parts, it can be seen that the feeder is constructed of a single sheet of cardboard or the like, the same being formed to provide a bottom wall 5 and end walls 6, 6, each end wall having a V-slit 7 therein to define a tapered flap 8. The sheet is further formed to provide an inner front wall 9, and a back wall 10 and extensions 11 of said rear wall 10.

The sheet is further formed to provide a top 12 and an outer front wall 13 which has end extensions 14, 14. The outer front wall 13 has struck-out tabs 15, 15.

As can be seen in Figure 5, short projections 16, 16 are provided at the ends of the top section 12, and this top section is formed with a multiplicity of substantially square openings 17.

In the forming of the feeder, it can be seen that the sheet is first folded on lines a, a and b, b, and in doing this, the extensions 11 of the back wall 10 project inwardly at the inner sides of the side walls 6, 6.

The structure is further folded on lines c, d, and e, and also the extensions 14, 14 of the outer front wall 13 are folded as at f, f, the extensions being folded so as to interlap the extensions 11 at the inside of the end walls 6, 6, while the tapered flaps 8 project over these extensions and bear against the gable effect of the top section 16, it being observed in Figure 2 that the tabs 15, 15 are disposed through openings 20, 20 in the inner front wall 9, while the gable formed short projection 16 on the top section 12 projects through the openings left by the tapered flaps 8 at the slits 7.

Thus the structure is interlocked together and cannot readily become disassembled.

There are ample openings 17 for a considerable number of chicks to feed simultaneously.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. A chicken feeder constructed from a blank consisting of a bottom, end walls having triangular shaped openings, a top wall sloping toward each side, front and back walls for the bottom, said end walls rising above the top and said top having extensions inserted through the openings of the end walls, said extensions being co-extensive with two sides of the openings and projecting outwardly beyond the end walls to maintain the end walls in an upright position through frictional engagement with the extensions, said top being integral with the back wall and an overlapping outer front wall carried by the top section, said top section being formed with a plurality of feeder openings, said outer front wall carried by the top section being formed with tabs, and said front wall for the bottom connection being formed with slits to receive said tabs.

2. A chicken feeder constructed from a blank consisting of a bottom, end walls having triangular shaped openings, a top wall sloping toward each side, front and back walls for the bottom, said end walls rising above the top and said top having extensions inserted through the openings of the end walls, said extensions being co-extensive with two sides of the openings and projecting outwardly beyond the end walls to maintain the end walls in an upright position through frictional engagement with the extensions, said top being integral with the back wall and an overlapping outer front wall carried by the top section, said top section being formed with a plurality of feeder openings, said outer front wall carried by the top section being formed with tabs, said front wall for the bottom connection being formed with slits to receive said tabs, and said back wall and outer front wall being formed with interlapping extensions.

3. A chicken feeder constructed from a blank consisting of a bottom, end walls having triangular shaped openings, a top wall sloping toward each side, front and back walls for the bottom, said end walls rising above the top and said top having extensions inserted through the openings of the end walls, said extensions being co-extensive with two sides of the openings and projecting outwardly beyond the end walls to maintain the end walls in an upright position through frictional engagement with the extensions, said top being integral with the back wall and an overlapping outer front wall carried by the top section, said top section being formed with a plurality of feeder openings, said outer front wall carried by the top section being formed with tabs, said front wall for the bottom connection being formed with slits to receive said tabs, and said extensions providing hand grips for carrying the feeder.

JAMES W. HARTMAN.